United States Patent
Rangachar Srinivasa et al.

(10) Patent No.: US 12,333,796 B2
(45) Date of Patent: Jun. 17, 2025

(54) BAYESIAN COMPUTE UNIT WITH RECONFIGURABLE SAMPLER AND METHODS AND APPARATUS TO OPERATE THE SAME

(71) Applicant: Intel Corporation, Santa Clara, CA (US)

(72) Inventors: Srivatsa Rangachar Srinivasa, Hillsboro, OR (US); Tanay Karnik, Portland, OR (US); Dileep Kurian, Portland, OR (US); Ranganath Krishnan, Hillsboro, OR (US); Jainaveen Sundaram Priya, Hillsboro, OR (US); Indranil Chakraborty, West Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 17/845,732

(22) Filed: Jun. 21, 2022

(65) Prior Publication Data

US 2022/0319162 A1 Oct. 6, 2022

(51) Int. Cl.
*G06V 10/84* (2022.01)
*G06F 7/544* (2006.01)
*G06V 10/82* (2022.01)

(52) U.S. Cl.
CPC ............ *G06V 10/84* (2022.01); *G06F 7/5443* (2013.01); *G06V 10/82* (2022.01)

(58) Field of Classification Search
CPC ............... G06F 7/5443; G06F 18/2321; G06F 18/24155; G06V 10/82; G06V 10/955

USPC ........................................................ 382/156
See application file for complete search history.

(56) References Cited

U.S. PATENT DOCUMENTS

| | | |
|---|---|---|
| 2018/0349158 A1 | 12/2018 | Swersky et al. |
| 2019/0347551 A1* | 11/2019 | Lobacheva ............ G06N 3/082 |
| 2020/0218982 A1 | 7/2020 | Annau et al. |
| 2020/0410364 A1 | 12/2020 | Willers et al. |

OTHER PUBLICATIONS

Girshick, "Fast R-CNN," arXiv:1504.08083v2, in Proceeding IEEE International Conference Computer Vision (ICCV), dated Sep. 27, 2015, 9 pages.

Krizhevsky et al., "ImageNet Classification with Deep Convolutional Neural Networks," Part of Advances in Neural Information Processing Systems 25 (NIPS 2012), 9 pages.

Szegedy et al., "Intriguing properties of neural networks," arXiv:1312.6199v4, dated Feb. 19, 2014, 10 pages.

(Continued)

*Primary Examiner* — Huy C Ho
(74) *Attorney, Agent, or Firm* — Hanley, Flight & Zimmerman, LLC

(57) ABSTRACT

Methods, apparatus, systems, and articles of manufacture providing a Bayesian compute unit with reconfigurable sampler and methods and apparatus to operate the same are disclosed. An example apparatus includes a number generator to generate a sequence of numbers; a multiplier to generate a plurality of products by multiplying respective numbers of the sequence of the numbers by a variance value; and an adder to generate a plurality of weights by adding a mean value to the plurality of products, the plurality of weights corresponding to a single probability distribution.

24 Claims, 7 Drawing Sheets

(56) References Cited

OTHER PUBLICATIONS

Alcorn et al., "Strike (with) a Pose: Neural Networks Are Easily Fooled by Strange Poses of Familiar Objects," arXiv:1811.11553v3, in Proceedings of the IEEE Conference on Computer Vision and Pattern Recognition, Apr. 18, 2019, 36 pages.

Lee et al., "A Simple Unified Framework for Detecting Out-of-Distribution Samples and Adversarial Attacks," arXiv:1807.03888v2, 32nd Conference on Neural Information Processing Systems (NIPS 2018), Montreal, Canada., dated Oct. 27, 2018, 20 pages.

Blum et al., "The Fishyscapes Benchmark: Measuring Blind Spots in Semantic Segmentation," arXiv:1904.03215v3, Sep. 9, 2019, 14 pages.

Kendall et al., "Bayesian SegNet: Model Uncertainty in Deep Convolutional Encoder-Decoder Architectures for Scene Understanding," arXiv:1511.02680v2, dated Oct. 10, 2016, 11 pages.

Kendall et al."What Uncertainties Do We Need in Bayesian Deep Learning for Computer Vision?," arXiv:1703.04977v2, 31st Conference on Neural Information Processing Systems (NIPS 2017), Long Beach, CA, Oct. 5, 2017, 12 pages.

Krishnan et a., "BAR: Bayesian Activity Recognition using variational inference," arXiv:1811.03305v2, Third workshop on Bayesian Deep Learning (NeurIPS 2018), Montréal, Canada, dated Dec. 1, 2018, 8 pages.

Subedar et al., "Uncertainty-aware Audiovisual Activity Recognition using Deep Bayesian Variational Inference," arXiv:1811.10811v3, in Proceedings of the IEEE International Conference on Computer Vision, dated Sep. 20, 2019, 10 pages.

Kingma et al., "Variational Dropout and the Local Reparameterization Trick," Part of Advances in Neural Information Processing Systems 28 (NIPS 2015), 9 pages.

Wen et al., "Flipout: Efficient Pseudo-Independent Weight Perturbations on Mini-Batches," arXiv:1803.04386v2, published as a conference paper at ICLR 2018, 16 pages.

Cai et al., "VIBNN: Hardware Acceleration of Bayesian Neural Networks," Session 5B Neural Networks, ASPLOS'18, Mar. 24-28, 2018, Williamsburg, VA, 13 pages.

Krishnan et al., "Improving model calibration with accuracy versus uncertainty optimization," 34th Conference on Neural Information Processing Systems (NeurIPS 2020), Vancouver, Canada, 12 pages.

Filos et al., "A Systematic Comparison of Bayesian Deep Learning Robustness in Diabetic Retinopathy Tasks," arXiv:1912.10481v, Fourth workshop on Bayesian Deep Learning (NeurIPS 2019), Vancouver, Canada, 12 pages.

Krishnan et al., "Improving MFVI in Bayesian Neural Networks with Empirical Bayes: a Study with Diabetic Retinopathy Diagnosis," Fourth workshop on Bayesian Deep Learning (NeurIPS 2019), Vancouver, Canada, 7 pages.

Naeini et al., "Obtaining Well Calibrated Probabilities Using Bayesian Binning," Association for the Advancement of Artificial Intelligence (www.aaai.org), 2015, 7 pages.

* cited by examiner

BAYESIAN COMPUTE UNIT WITH RECONFIGURABLE SAMPLER AND METHODS AND APPARATUS TO OPERATE THE SAME

FIELD OF THE DISCLOSURE

This disclosure relates generally to machine learning, and, more particularly, to a Bayesian compute unit with reconfigurable sampler and methods and apparatus to operate the same.

BACKGROUND

In recent years, artificial intelligence (e.g., machine learning, deep learning, etc.) have increased in popularity. Artificial intelligence may be implemented using neural networks. Neural networks are computing systems inspired by the neural networks of human brains. A neural network can receive an input and generate an output. The neural network includes a plurality of neurons corresponding to weights can be trained (e.g., can learn, be weighted, etc.) based on feedback so that the output corresponds a desired result. Once the weights are trained, the neural network can make decisions to generate an output based on any input. Neural networks are used for the emerging fields of artificial intelligence and/or machine learning. A Bayesian neural network is a particular type of neural network that includes neurons that generate a variable weight as opposed to a fixed weight. The variable weight falls within a probability distribution defined by a mean value and a variance determined during training of the Bayesian neural network.

Figure 1:
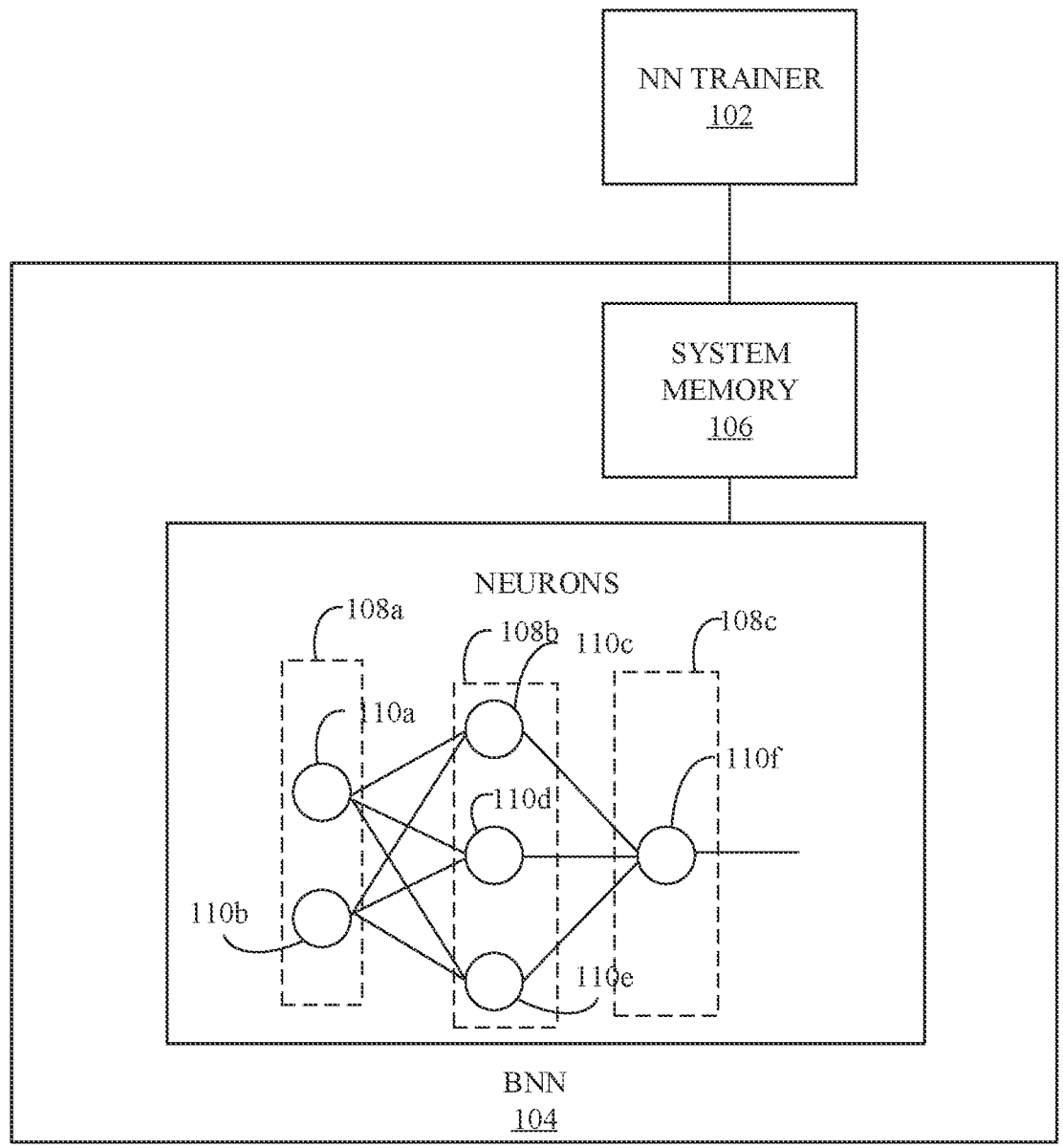
FIG. 1 is a schematic illustration of an example Bayesian neural network.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Machine learning models, such as neural networks, are used to perform a task (e.g., classify data). Machine learning can include a training stage to train the model using ground truth data (e.g., data correctly labelled with a particular classification). Training a traditional neural network adjusts the weights of neurons of the neural network. After trained, data is input into the trained neural network and the weights of the neurons are applied to input data to be able to process the input data to perform a function (e.g., classify data).

Overfitting and/or sensitivity to malicious attacks negatively affect the performance and/or reliability of traditional neural networks. Overfitting occurs when a model is trained to have too small of an error. If the training results in too small of an error, the model has a difficult time generalizing for new situations. Malicious attacks can exploit a combination of overfitting and/or knowledge of the underlying neural network model. Sensitivity to malicious attacks is the result of a trained model being overconfident in its outputs. If a model is overconfident, small perturbations to the inputs can result in undesired and/or unpredictable changes in the output. Both of the above problems are caused by the failure of traditional neural networks to include uncertainty information in a finite set of training data.

Bayesian neural networks (BNNs) introduce uncertainty information to overcome the problems of overfitting and sensitivity to malicious attacks. Instead of using fixed weights, BNNs introduce weights associated with conditioned probability distribution (e.g., the output weight may be a value within a probability distribution defined by a mean (herein also referred to as mu or u) and standard deviation and/or variance). Because BNNs introduce some amount of randomness, BNNs can be trained with smaller training data without sacrificing accuracy. However, traditional BNNs with neurons that generate weights corresponding to a probability distribution require a lot of power and/or hardware to implement. Therefore, such traditional BNNs are slow due to bottlenecks caused by the sampling of a probability distribution and/or the multiple iterations of forward passes of a BNN with different weight value(s) sampled from the distribution. For example, traditional BNN generate a single weight per probability distribution which requires a lot of overhead to generate and/or store multiple weights because the traditional systems access the mean and variance from system memory for every weight generated.

Examples disclosed herein include an efficient programmable sampling unit that supports both Gaussian distribution models and Gaussian mixture model (GMM) distribution models. As used herein, a unit may include a hardware (e.g., a circuit, a processor, etc.), software, firmware, and/or any combination thereof. The programmable sampling unit can be configured to output multiple samples from a parameterized Gaussian distribution as well as GMM models based on one or more mean value(s) and/or variance value(s) corresponding to a single probability distribution. In this manner, the mean and variance value(s) corresponding to the signal probability distribution are accessed from the system memory once and multiple different weights can be generated and used based on the single distribution, thereby allowing low sampling overhead. Additionally, examples disclosed herein further incorporate sampling units inside the compute units of a BNN to allow the ability to run BNN workloads locally in the compute unit to further reduce the bottlenecks associated distributing multiple weights to the compute nodes. Accordingly, examples disclosed herein result in a more efficient artificial intelligence-based compute unit that reduces the amount of data movement to generate and apply weights corresponding to a probability distribution.

In general, implementing a machine learning (ML)/artificial intelligence (AI) system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters may be used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, training is performed until a threshold number of actions have been predicted. In examples disclosed herein, training is performed either locally (e.g., in the device) or remotely (e.g., in the cloud and/or at a server). Training may be performed using hyperparameters that control how the learning is performed (e.g., a learning rate, a number of layers to be used in the machine learning model, etc.). In some examples re-training may be performed. Such re-training may be performed in response to a new program being implemented or a new user using the device. Training is performed using training data. When supervised training may be used, the training data is labeled. In some examples, the training data is pre-processed.

Once training is complete, the model is deployed for use as an executable construct that processes an input and provides an output based on the network of nodes and connections defined in the model. The model is stored locally in memory (e.g., cache and moved into memory after trained) or may be stored in the cloud. The model may then be executed by the computer cores.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a schematic illustration of an example neural network (NN) trainer 102 to train example BNN 104. The example BNN 104 includes an example system memory 106 and example layers 108a-c including example neurons 110a-f (herein referred to as neurons or computed nodes). Although the illustrated neurons 110 of FIG. 1 include six neurons in three layers, there may be any number of neurons in any type of configuration. Although the example of FIG. 1 is described in conjunction with the BNN 104, examples disclosed herein may be utilized in any AI-based system or model that includes weights.

The example NN trainer 102 of FIG. 1 trains the BNN 104 by selecting a mean weight and an amount of deviation for the mean weight for each of the neurons 110. Initially, the BNN 104 is untrained (e.g., the neurons are not yet weighted with a mean and deviation). To train the BNN 104, the example NN trainer 102 of FIG. 1 uses training data (e.g., input data labelled with known classifications and/or outputs) to configure the BNN 104 to be able to predict output classifications for input data with unknown classification. The NN trainer 102 may train a model with a first set of training data and test the model with a second set of the training data. If, based on the results of the testing, the accuracy of the model is below a threshold, the NN trainer 102 can tune (e.g., adjust, further train, etc.) the parameters of the model using additional sets of the training data and continue testing until the accuracy is above the threshold. After the NN trainer 102 has trained the BNN 104, the example NN trainer 102 stores the corresponding means and deviations for the respective neurons 110 in the example system memory 106 of the example BNN 104. The example NN trainer 102 may be implemented in the same device as the BNN 104 and/or in a separate device in communication with the example BNN 104. For example, the NN trainer 102 may be located remotely, develop the weight data locally, and deploy the distribution data (e.g., means and variance for the respective neurons 110) to the BNN 104 for implementation (e.g., generation of weights that correspond to the determine distribution data).

The example BNN 104 of FIG. 1 includes the example system memory 106. The example system memory 106 stores the probability distribution data for the example NN trainer 102 in conjunction with a particular neuron (e.g., a mean and/or variance corresponding to a probability distribution for one or more compute nodes/neurons). For example, a first section of the system memory 106 is dedicated for a first mean value(s) and a first variance value(s) for a first neuron or a first layer of neurons, a second section of the system memory 106 is dedicated to a second mean value(s) and a second variance value(s) for a second neuron or a second layer of neurons, etc. The mean value(s) may be stored in the dedicated section as a bit value(s) representative of the mean value(s). As further described below, the programmable sampling unit of FIGS. 2A, 2B, 3, and/or 4 generate random numbers and/or pseudo random numbers that are used in conjunction with the stored mean value(s) and variance value(s) to generate a plurality of weights that correspond to a single probability distribution (e.g., Gaussian distribution) or the single mixture model (e.g., GMM) samples that correspond to a mixture probability distribution (e.g., with two or more means and/or two or more variances).

The example neurons 110a-f of FIG. 1 are structured in the example layers 108a-c. As further described below, the neurons 110a-f are implemented by compute nodes including, or in communication with, one or more programmable sampling units. The example neurons 110a-f receive input/activation data, generate one or more weights and/or samples that corresponds to a probability distribution or mixture probability distribution and apply the weights and/or samples to the input data (e.g., for the first layer) or activation data (e.g., for the subsequent layers) to generate an output. For example, if the probability distribution of a neuron follows a standard normal distribution, the mean weight of the neuron is 0.7, and the variance of the neuron is 0.01 (e.g., the standard deviation is 0.1), then the will be a 68% chance that the neuron will generate a weight between 0.6 and 0.8 (e.g., one standard deviation away from the mean), a 95% chance that the neuron will output a weight between 0.5 and 0.9 (e.g., two standard deviations away from the mean), etc. Accordingly, the weight generated by the output may be different every time a weight is generated but will follow the probability distribution. Thus, the example neurons 110a-f provide randomness that can counteract overfitting and sensitivity to malicious attacks. The structure of the example layer 108b including example neurons 110c-e is further described below in conjunction with FIGS. 2A and 2B.

Figure 2A:
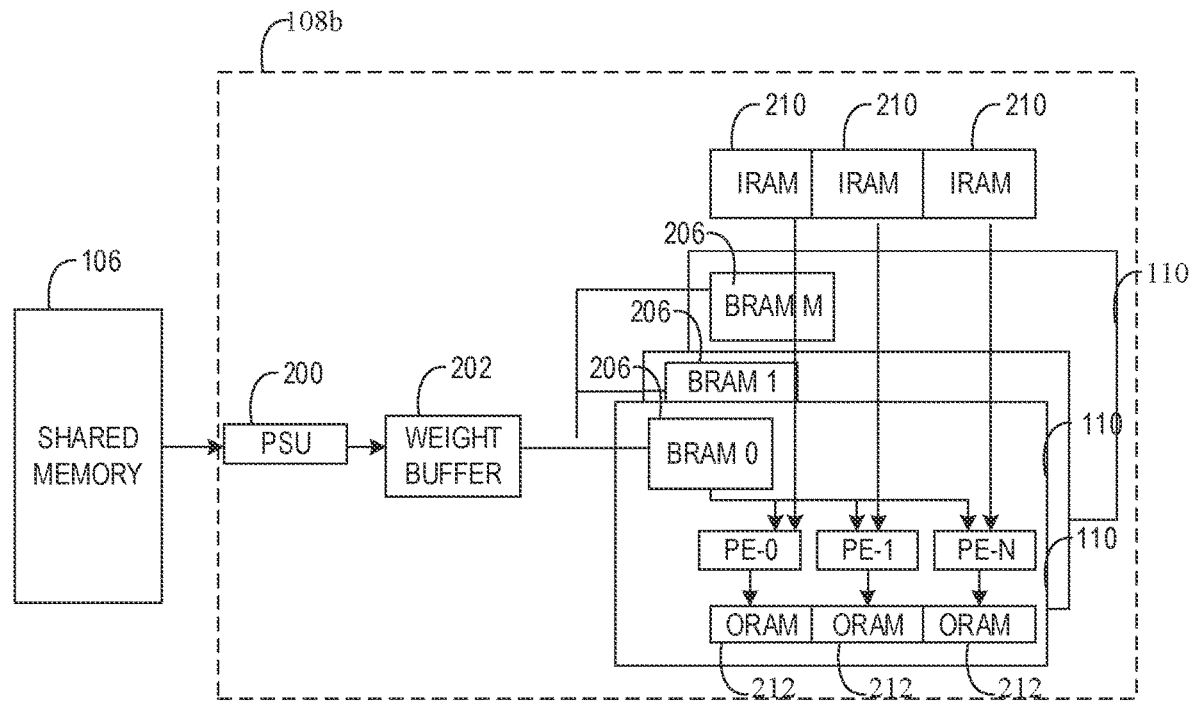
FIGS. 2A and 2B are block diagrams of example implementations of a layer of the Bayesian neural network of FIG. 1.

FIG. 2A is a block diagram of the example layer 108b include the example neurons (as referred to as tiles, compute units, or Bayesian compute units) 110c-e of FIG. 1. However, FIG. 2A could be described in conjunction with any of the example layers 108a-c and/or any of the neurons 110a-f. The example of FIG. 2A includes the example system memory 106 of FIG. 1. The example of FIG. 2A further include an example programmable sampling unit (PSU) (also referred to as a programmable sampling circuit) 200, an example weight buffer 202, example weight memory 206, example processing elements (PEs) 208, example input memory 210, and an example output memory 212. Although the example of FIG. 2A includes three processing elements implemented in three respective tiles to obtain data from three storage elements and output data into three storage elements, there may be any number of storage elements, processing elements in any number of tiles.

The example PSU 200 of FIG. 2 obtains mean value(s) and variance value(s) corresponding to a single probability distribution from the example system memory 106. As described above, the mean value(s) and variance value(s) correspond to a single probability distribution to be used to generate weights for one or more of the compute units 110c-e. Each layer 108a-c may correspond to the same or different probability distributions. In some examples, the weights correspond to a mixture probability distribution (e.g., a distribution with two or more modes). In such examples, the system memory 106 may include two or more mean value(s) and/or variance value(s) for the mixture probability distribution and the PSU 200 generates GMM samples corresponding to the mixture model probability distribution. The example PSU 200 generates multiple weights or samples corresponding to the probability distribution based on the mean value(s) and/or variance value(s). For example, if the mean is 0.7 and the variance is 0.1, the PSU 200 may generate N weights (e.g., 40 weights) that corresponds to the probability distribution that is based on a mean of 0.7 and a variance of 0.1. As further described below, the example PSU 200 generates multiple weight or samples based on a single probability distribution. In this manner, different input data in a batch or different forwarded processing passes can be performed in parallel (e.g., simultaneously) using the different weights and/or samples without requiring updated mean and variance numbers, thereby reducing the resources (e.g., processing resources, bandwidth, clock cycles, etc.) needed to transmit updated mean and variance values from the system memory 106 to the PSU 200. In some examples, multiple forward passes are performed independently for each forward pass. In such examples, the PSU 200 generates weight samples, which are stored in the weight buffer 202 and then moved to the respective weight memories 206 (e.g., a first group of weights for the first weight memory 206 of tile 0, a second group of weights for the second weight memory 206 of tile 1, etc.). In some examples, if the batch size is greater than 1 (e.g., corresponding to multiple images in a batch), different weight samples are used for the different images. The example PSU 200 is further described below in conjunction with FIG. 4.

The example weight buffer 202 of FIG. 2 stores the weights or samples generated by the PSU 200. The weight buffer may be any type of memory or storage unit. The weight buffer 202 stores the multiple weights that correspond to a probability distribution based on the mean value and/or variance. Additionally or alternatively, in GMM mode, the weight buffer 202 stores multiple GMM samples that correspond to a mixture model probability distribution based on two or more mean and variance values. Once stored, the example weight buffer 202 outputs the weights to the example weight memory 206 (e.g., BRAM 0-BRAM M) of the individual compute units 110c-e (e.g., tile 0-tile M)

The example weight memory 206 of FIG. 2 stores the weights locally at the corresponding compute nodes 110c-e (e.g., a first set of the weights for the first tile, a second set of the weights for the second tile, etc.). In this manner, the example PE 208 of a corresponding compute node 110c-e can access the weights to apply to multiple input data and/or multiple activation data, as further described below in conjunction with FIG. 3. In the example of FIG. 2A, the weight memory 206 is random access memory (RAM). However, the example weight memory 206 may be implemented by any type of storage.

The example PEs 208 of FIG. 2A apply the weights stored in the weight memory 206 to the input data and/or activation data stored in the example input memory 210. In the example of FIG. 2A, the input memory 210 is random access memory (RAM). However, the example input memory 210 may be implemented by any type of storage. The PEs 208 of FIG. 2 apply one or more of the weights corresponding to a single probability distribution to the corresponding input and/or activation data to weight the input and/or activation data to generate output data. The example PEs 208 store the output data in the example output memory 212. The operation of the PEs 208 is further described below in conjunction with FIG. 3.

The example output memory 212 of FIG. 2 stores the output of the PEs 208. In the example of FIG. 2A, the output memory 212 is random access memory (RAM). However, the example output memory 212 may be implemented by any type of storage. The output data in the output memory 212 may be output to a compute node in a subsequent layer 108c, to a different one of the compute nodes 110c-e within the same layer 108b (e.g., for another pass in a different compute node), or put back into the input memory 210 (e.g., for another pass in the same compute node).

Figure 2B:
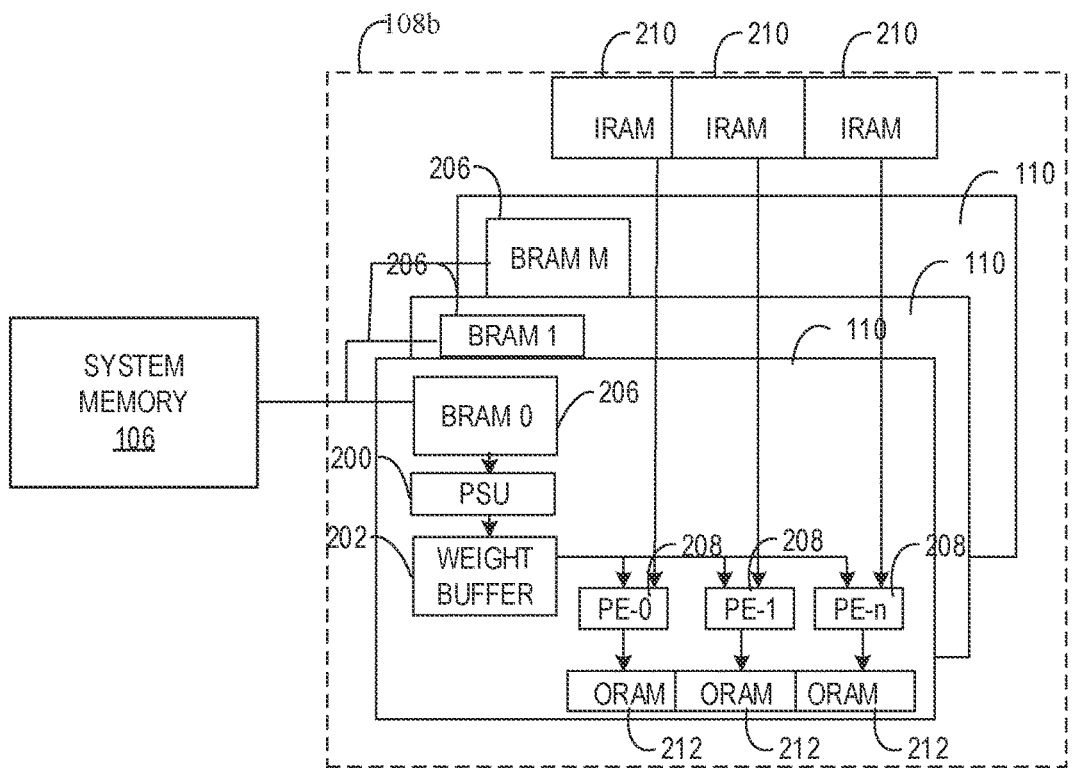

Although the example of FIG. 2A reduces resources (e.g., storage capacity based on the precision of mu and sigma) by generating multiple sets of weights for all the compute nodes 110c-e based on a single probability distribution (e.g., a mean value and variance value for a probability distribution or multiple mean values and variance value(s) for a GMM distribution), the plurality of sets of weights need to be distributed to each of the compute nodes 110c-e, thereby corresponding to a lot of bandwidth and/or a bottleneck of data. FIG. 2B includes an alternative implementation that reduces the bandwidth and bottleneck issues of the implementation of FIG. 2A.

FIG. 2B is an alternative block diagram of the example layer 108b include the example neurons (as referred to as tiles, compute units, or Bayesian compute units) 110c-e of FIG. 1. However, FIG. 2B may be described in conjunction with any of the layers 108a-c and/or any one of the compute nodes 110a-f. The example of FIG. 2B includes the example system memory 106 of FIG. 1. The example of FIG. 2B further include the example programmable sampling unit (PSU) 200, the example weight buffer 202, the example weight memory 206, the example processing elements (PEs) 208, the example input memory 210, and the example output memory 212. Although the example of FIG. 2A includes three processing elements and three tiles to obtain data from three storage elements and output data into three storage elements, there may be any number of storage elements, processing elements in any number of tiles.

In the example of FIG. 2B, the PSU 220 and the example weight buffer 202 is multiple weight buffers, each buffer located in one of the compute nodes 110c-e. In the example implementation, the example weight memory 206 obtains the mean and variance value(s) from the system memory 106. In this manner, the PSU 200 can access the mean and variance value(s) from the weight memory 206 to generate the weights and/or samples in parallel (e.g., simultaneously) that correspond to a probability distribution based on the mean and the variance value(s) of a single probability distribution and output the weights to the example weight buffer 202. The number of weights that the PSU 200 of a particular tile generates corresponds to the number of activations that the particular tile will process. Because the PSU 200 and the weight buffer 202 is implemented in the respective compute nodes 110c-e, the only value(s) that need to be spread to the individual compute nodes 110c-e are the mean and variance values and the multiple weights corresponding to respective compute nodes 110c-e are generated at the respective compute nodes 110c-e. Thus, the bandwidth needed to distribute information to the compute nodes is significantly reduced, thereby alleviating the bottleneck associated with FIG. 2B.

Figure 3:
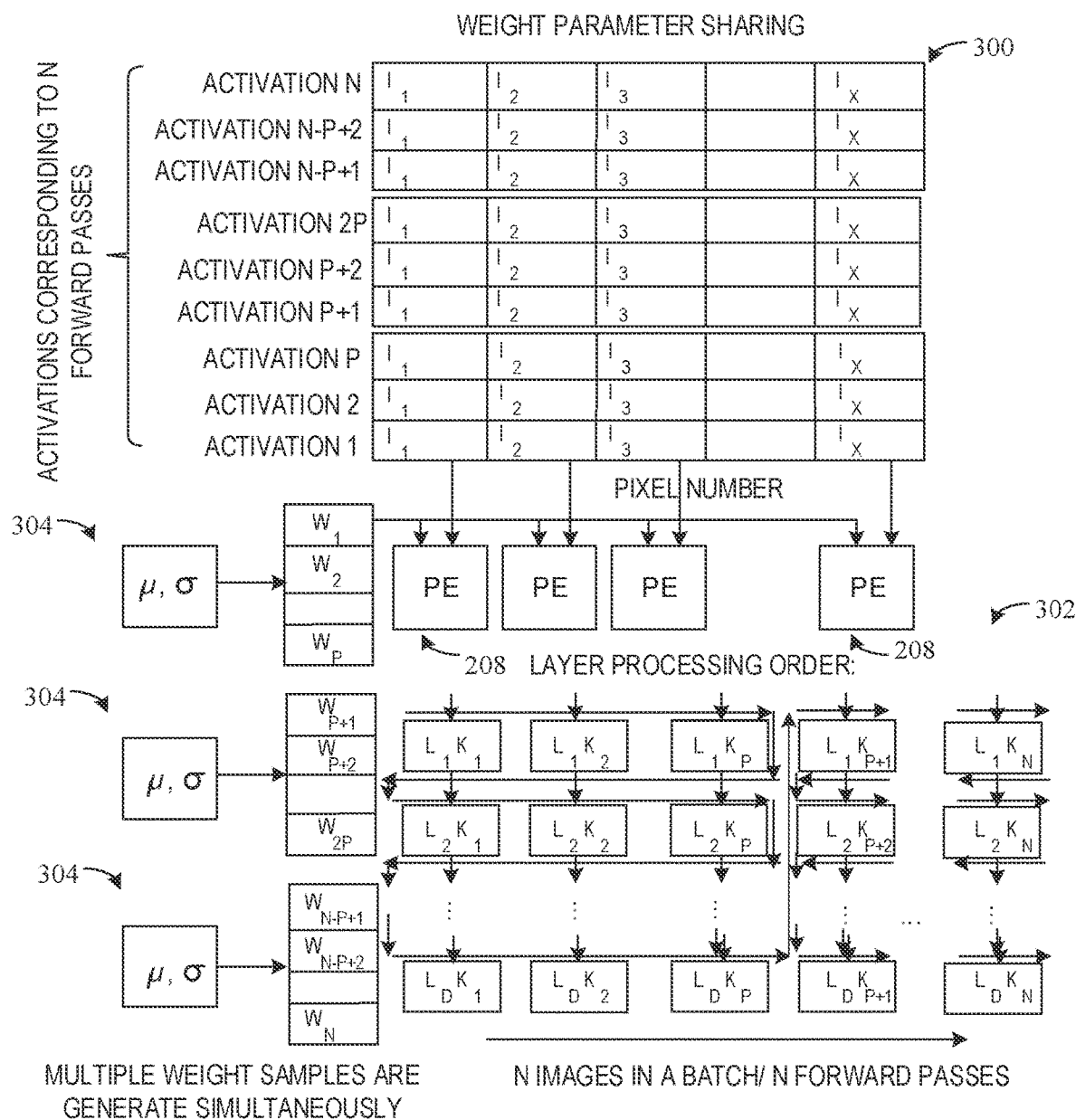
FIG. 3 illustrates an example of the data processing flow of example processing elements of the layers of FIGS. 2A and/or 2B.

FIG. 3 illustrates an example of the processing input activations to generate output values for a subsequent layer. Although the example of FIG. 3 is described in conjunction with activations, the activations may be replaced with input values (e.g., for a first layer of the BNN 104). The example of FIG. 3 includes the example PEs 208 of FIGS. 2A and 2B. The example of FIG. 3 further includes example activation data 300 corresponding to N forward passes and/or N data groups (e.g., N images in a batch), an example mean value and variance value 304, example sets of weights 310, 312, 314 an example layer processing order 302.

The example activations 300 are stored in the example input memory 210 of FIGS. 2A and 2B. The set include p activations corresponding to subsets of the N forward passes (e.g., where N can be any number of forward passes, such as 1, 2, 3, 4, etc.), resulting in a N total processed activations. The first subset of forward passes corresponds to activations [1, p] to be processed by tile 0, the second subset of forward passes corresponds to activations [p+1, 2p] to be processed by tile 1, . . . the Xth subset of forward passes corresponds to activations [N−p+1, N] to be processed at tile M. The activations may correspond to any type of data. For example, the activations may be pixel data when the activations correspond to image and/or video data. Each activation corresponds to a set of data broken into subdata that is stored in the example input memory 210. For example, if there are 16 input memories 210 connected to 16 PEs 208, then activation 1 is split into $I_1, I_2, I_3 \ldots I_{16}$, activation 2 is split into $I_1, I_2, \ldots I_{16}$, etc.

The example PEs 208 of the first tile (Tile O) FIG. 2A and/or 2B access the first p activations [1-p] (e.g., corresponding to different forwarded passes or different images in a batch) from the input memory 210 and the first p weights $[w_1, w_p]$ from the weight memory 206 (e.g., based on a probability distribution corresponding to the mean value(s) and variance value(s) 304). As described above, the weights $w_1$ through $w_N$ are generated by the PSU 200 of FIGS. 2A and/or 2B based on one or more mean and variance values corresponding to a single probability distribution. The PSU 200 generates the number of weights based on the number of activations (e.g., the N number of images in a batch or the N number of forward passes). In the example of FIG. 2A, the PSU 200 generates all the weights for all the tiles and distributes sets of the weights to respective tiles. In the example of FIG. 2B, the PSU 200 of the first compute node (e.g., the compute node 110c) generates the first set of weights [w1, wp], the second PSU 200 of the second compute node (e.g., the compute node 110d) may generate the second set of weights $[w_{p+1}, w_{2p}]$, etc. The processing of multiple activations (e.g., with from multiple images in a batch or multiple forward passes) is done in parallel (e.g., simultaneously). Accordingly, when weight parameters (mean and variance) are moved from the system memory 106 to the PSU 200 (for FIG. 2A) or the weight memory 206 (for FIG. 2B), multiple weight values are sampled/generated at one time and activations corresponding to different images in a batch or different forwarded passes are processed with the corresponding weight samples.

The example PEs 208 of FIG. 3 apply the set of weights to the corresponding subset of the activations. For example, the first PE 208 of the first compute node (e.g., tile 0) applies the weights $w_1$-$w_p$ to the first data point ($I_1$) of the first p activation (activation 1 through activation p), the second PE 208 applies weights $w_1$-$w_p$ to the second datapoint ($I_2$) of the first p activations (activation 1 through activation p), . . . , and the Xth PE 208 applies the weights $w_1$-$w_p$ to the Xth datapoint ($I_X$) of the first p activations (activation 1 through activation p), where each activation corresponds to a different image in a batch or a different forward pass. In some examples, at the same time, the second compute node 110*d* (e.g., tile 1) of the same layer 108*b* applies the set of weights to the correspond second subset of activations. For example, the first PE 208 of the second compute node (e.g., tile 1) applies the weights [$w_{p+1}$, $w_{2p}$] to the first data point (I1) of the activations p+1 through 2p, the second PE 208 applies weights [$w_{p+1}$, $w_{2p}$] to the second datapoint ($I_2$) of the first p activations p+1 through 2p, etc. After the weights are applied to the activations, the output data is stored in the example output memory 212 and passed to a subsequent layer (or passed back to the input memory 210 or input memory of a previous layer for a subsequent iteration). After storing the output in the output memory 212, the example PEs 208 can process a subsequent image(s) and/or forward pass using the same or updated weights.

Figure 4:
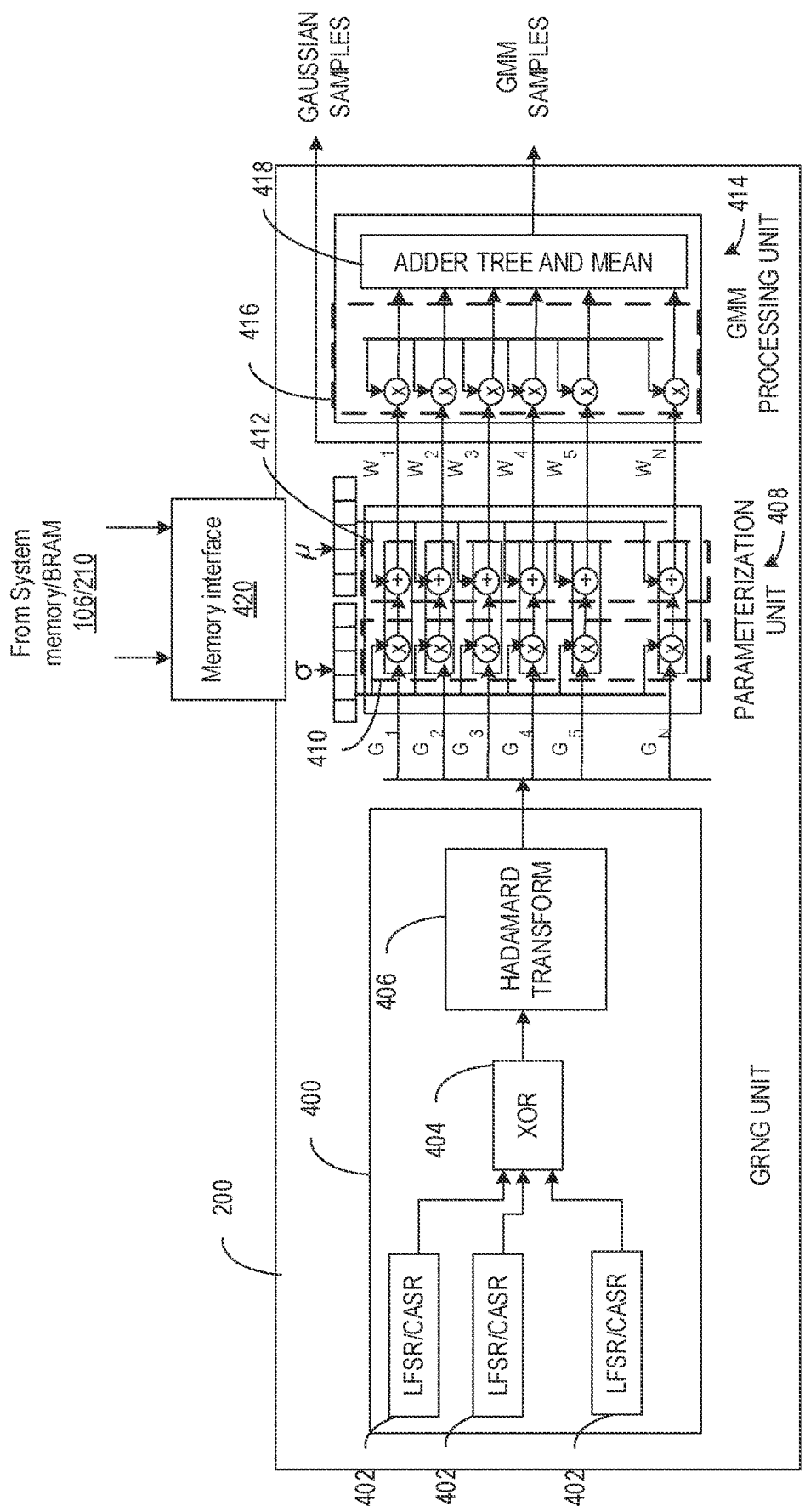
FIG. 4 is a block diagram of an example implementation of the programmable sampling unit of the layer of FIGS. 2A and/or 2B.

FIG. 4 is a block diagram of the example PSU 200 of FIGS. 2A and 2B. The example PSU 200 includes an example Gaussian random number generator (GRNG) unit 400, an example registers 402, an example logic gate 404, an example Hadamard transform circuit 406, an example parameterization unit 408, an example multiplication array 410, an example addition array 412, an example GMM processing unit 414, an example multiplier array 416, an example adder tree and mean unit 418, and an example memory interface 420.

The example GRNG unit 400 of FIG. 4 generates a random sequence of numbers (e.g., an array of numbers). In some examples, the GRNG unit 400 is a circuit. The numbers may be in any format (e.g., fixed point, floating point, etc.). The example GRNG unit 400 includes the example registers 402. The example GRNG unit 400 includes the example registers 402. The registers 402 may be linear feedback shift registers, cellular automata shift registers, and/or any other type of shift register. The example registers 402 may be variable length and concatenated to form a long uniform pseudo random sequence. The length of the individual units may be co-prime of each other to ensure pseudo randomness across the long sequence. The registers 402 may output pseudo random sequence that is N-bits long, where in N is a power of 2. The multiple outputs of the registers 402 are input into the example logic gate 404.

The example logic gate 404 of FIG. 4 performs an exclusive or (XOR) function based on the multiple outputs of the registers 402. The output of the logic gate 404 (e.g., the XOR of the multiple outputs of the registers 402) is a N-bit pseudo random sequence that is supplied to the example Hadamard transform circuit 406. The Hadamard transform circuit 406 converts the N-bit pseudo random sequence output by the logic gate 404 to a (N+k) bit Gaussian pseudo random sequence (e.g., $G_1$-$G_N$), where k is the number of stages in the Hadamard Transform circuit 406. The different number of the sequence ($G_1$-$G_N$) output of the Hadamard transform circuit 406 have a zero mean and unit variance. The output sequence is input into the example parameterization unit 408.

The example parameterization unit 408 generates multiple weights in parallel (e.g., simultaneously) that correspond to a probability distribution based on a single mean and variance value. The example parameterization unit 408 obtains the single mean and variance value from the system memory 106 and/or the weight memory 210 via the memory interface 420. To generate the weights, the parameterization unit 408 multiplies the variance by each of the numbers in the sequence ($G_1$-$G_N$) output by the GRNG Unit 400 and adds the mean to the resulting product. For example, the multiplier array 410 multiplies the single variance value (e.g., from the system memory 106 for FIG. 2A and/or from the weight buffer 202 for FIG. 2B) to each of the number ($G_1$-$G_N$) of the output sequence from the GRNG unit 400 to generate an array of N products. The adder array 412 adds the single mean value to the array of products to generate N weights. The N weights is represented below based on Equation 1.

$$w_n = (G_n)(\sigma) + \mu, \text{ for } n=1, 2, \ldots N \quad \text{(Equation 1)}$$

In Equation 1, w is the weight, G is a number of the sequence output by the GRNG unit 400, $\mu$ is the mean, and $\sigma$ is the variance. The example parameterization unit 208 supports FP16 representation formal, INT8 representation format, and/or any other representation format. For some representation formals (e.g., FP16), floating point conversion circuitry may be included to convert the fixed point output of the GRNG unit 400 to floating point prior to inputting into the example parameterization unit 408. In some examples, the output of the Hadamard transform circuit 406 includes a total number of numbers in the sequence sufficient to apply to N activations. In this manner, the parameterization unit 408 can generate a plurality of weights for the N activations. Thus, one or more of the PEs 208 can process N activations corresponding to N forward passes or N images in a batch using the N weights that correspond to a single probability distribution. The output of the parametrization unit (e.g., the weights $w_1$-$w_N$), may be output to the weight buffer 202 of FIGS. 2A and 2B and/or to the example GMM processing unit 414.

The PSU(s) 200 of FIG. 2A and/or 2B can operate in Gaussian mode or GMM mode. In Gaussian mode, the PSU(s) 200 generate(s) multiple weights and/or samples that correspond to a single probability distribution corresponding to with one mean and one variance. In GMM mode, the PSU(s) 200 generate(s) multiple weights and/or samples that correspond to a single mixture model probability distribution corresponding to two or more means and two or more variances. For GMM mode, the weights are output into the example GMM processing unit 414 to generate the sample that correspond to the multi model distribution.

The example GMM processing unit 414 of FIG. 4 is used to generate weights and/or samples that correspond to a mixture model probability distribution (e.g., a Gaussian probability distribution with two or more means and/or variance values). In some examples, the compute nodes may be trained to generate weights that correspond to a mixture model distribution. In such examples, the GMM processing unit 414 can access the additional mean value(s) and/or variance value(s) from the system memory 106 that correspond to the mixture model distribution. A GMM distribution with M modes is represented in the below Equation 2.

$$N_{GMM} = \Sigma_i \phi_i N(\mu_i, \sigma_i^2) \quad \text{(Equation 2)}$$

In the above-Equation 2, $\mu_i$ and $\sigma_i^2$ are the mean and variance of the $i^{th}$ Gaussian distribution in the GMM and $\phi_i$ is the weight of that distribution. GMM is characterized by multiple trained distributions to help improve the accuracy of Neural networks. The example GMM processing unit 414 generates the GMM based on the below Equation 3, which corresponds to a rewritten version of Equation 2.

$$N_{GMM} = N(\Sigma_i \phi_i \mu_i, \Sigma_i \phi_i^2 \sigma_{ij}^2) \quad \text{(Equation 3)}$$

For example, the example GMM processing unit 414 includes an example multiplier array 416 that multiplies the output weights of the example parameterization unit 408 by the $\phi_{1-M}$ additional variance value(s). The example adder tree and mean circuit 418 obtains the products (e.g., the weights multiplied by $\phi_i$) and accumulates to generate samples representative of the mixture model distribution. The example adder tree and means circuit 418 outputs the GMM samples to the example weight buffer 202.

The example memory interface 420 of FIG. 4 accesses mean value(s) and/or variance value(s) from the example system memory 106 and/or the example weight memory 210. The example memory interface 420 provides the obtained and/or accessed mean value(s) and/or variance value(s) to the example parameterization unit 408 and/or the example GMM processing unit 414 for the generation of the weights and/or samples that correspond to a single probability distribution.

While an example manner of implementing the BNN 104 of FIG. 1 is illustrated in FIGS. 1-4, one or more of the elements, processes and/or devices illustrated in FIGS. 1-4 may be combined, divided, re-arranged, omitted, eliminated and/or implemented in any other way. Further, the example system memory 106, the example layers 108*a-c*, the example compute nodes 110*c-e*, the example PSU 200, the example wight buffer 202, the example weight memory 206, the example PEs 208, the example input memory 210, the example output memory 212, the example GRNG unit 400, the example registers 402, the example logic gate 404, the example Hadamard transform unit 406, the example parameterization unit 408, the example multiplier array 410, the example adder array 412, the example GMM processing unit 414, the example multiplier array 416, the example adder tree and mean unit 418, the example memory interface 420, and/or, more generally, the example BNN 104 of FIGS. 1-4 may be implemented by hardware, software, firmware and/or any combination of hardware, software and/or firmware. Thus, for example, any of the example system memory 106, the example layers 108*a-c*, the example compute nodes 110*c-e*, the example PSU 200, the example wight buffer 202, the example weight memory 206, the example PEs 208, the example input memory 210, the example output memory 212, the example GRNG unit 400, the example registers 402, the example logic gate 404, the example Hadamard transform unit 406, the example parameterization unit 408, the example multiplier array 410, the example adder array 412, the example GMM processing unit 414, the example multiplier array 416, the example adder tree and mean unit 418, the example memory interface 420, and/or, more generally, the example BNN 104 of FIGS. 1-4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system memory 106, the example layers 108*a-c*, the example compute nodes 110*c-e*, the example PSU 200, the example wight buffer 202, the example weight memory 206, the example PEs 208, the example input memory 210, the example output memory 212, the example GRNG unit 400, the example registers 402, the example logic gate 404, the example Hadamard transform unit 406, the example parameterization unit 408, the example multiplier array 410, the example adder array 412, the example GMM processing unit 414, the example multiplier array 416, the example adder tree and mean unit 418, the example memory interface 420, and/or, more generally, the example BNN 104 of FIGS. 1-4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example BNN 104 of FIGS. 1-4 may include one or more elements, processes and/or devices in addition to, or instead of, those illustrated in FIGS. 1-3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
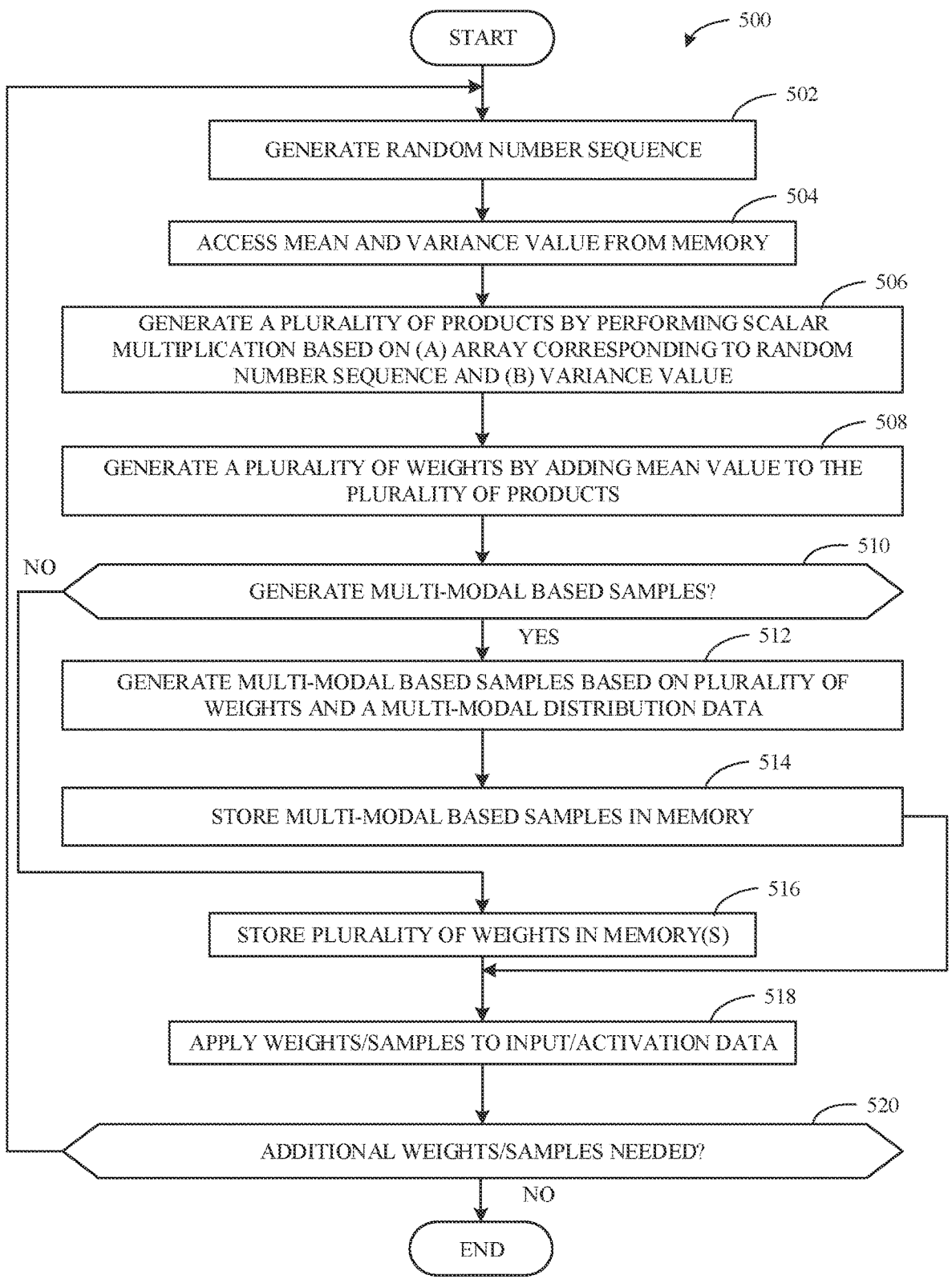
FIG. 5 is a flowchart representative of example machine readable instructions which may be executed to implement the example Bayesian compute node and/or the programmable sampling unit of FIGS. 2A, 2B, 3, and/or 4.

A flowchart representative of example hardware logic, machine readable instructions, hardware implemented state machines, and/or any combination thereof for implementing the example BNN 104 of FIGS. 1-4 is shown in FIG. 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example BNN 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 which may be executed to implement any one of the layers 108*a-c* of FIGS. 1-4 to apply a plurality of weight samples corresponding to a single probability distribution to activations. Although the instructions 500 are described in conjunction with the example layer 108*b* of FIGS. 1-4, the instructions 500 may be described in conjunction with any neuron in any type of neural network or other AI-based model using any type of data (e.g., input data or activations).

At block 502, the example GRNG unit 400 generates a random number (or pseudo random number) sequence (e.g., including a plurality of numbers $G_1$-$G_N$ corresponding to the number of activations to be processed at the entire layer 108*b* for FIG. 2A or the number of activations to be processed by a particular one of the compute nodes 110*c-e* for FIG. 2B). For FIG. 2A, the GRNG unit 400 generates weights for all activations to be processed by all tiles in the layer 108*b*. In FIG. 2B, the GRNG unit 400 generates weights for the activations to be processed by a single tile. The GRNG unit 400 may generate the random number sequence based on a Hadamard transform of an XOR operation of outputs of multiple registers 402, as described above in conjunction with FIG. 4. At block 504, the example parameterization unit 408 access a mean value and a variance value from the system memory 106 (e.g., directly for FIG. 2A and via the weight memory 206 for FIG. 2B).

At block 506, the example multiplier array 410 generates a plurality of products ($\sigma G_1$, $\sigma G_2$, ... $\sigma G_N$) by performing a scalar multiplication based on (a) an array of the random numbers from the random number sequence (e.g., $G_1$-$G_N$) and (b) the variance value (e.g., 6). At block 508, the example adder array 412 generates a plurality of weights (e.g., $w_1$-$w_N$) corresponding to the single mean ($\mu$) and variance value ($\sigma$) by adding the mean to the plurality of products. Because the random number sequence includes N total numbers corresponding to the total number of activations to be processed, the adder array 412 generate N weights corresponding to a probability distribution based on the single mean and variance value.

At block 510, the example GMM processing unit 414 determines the PSU 200 is operating in GMM model (e.g., to generate a probability distribution corresponding to multiple modes and variances). For example, the system memory 106 may store an indication that the probability distribution to be used is mixture model and/or may include multiple means and variances when the probability distribution to be used is a mixture model distribution. If the example GMM processing unit 414 determines that mixture model samples are needed (block 510: YES), the example GMM processing unit 414 generates mixture model based samples based on the plurality of weights and mixture model distribution data (block 512). For example, the array multiplier 416 multiplies the weights $w_1$-$w_N$ by the value $\phi_{i-N}$ (e.g., which is stored in the example system memory 106) to generate products corresponding to the mixture model distribution. Additionally, the example adder tree and mean circuit 418 adds one or more additional means to the mixture model based products to generate the mixture model samples. At block 514, the example GMM processing unit 414 outputs the GMM samples and the example weight buffer 202 stores the GMM samples.

If the example GMM processing unit 414 determines that mixture model samples are not needed (block 510: NO), the parameterization unit 408 outputs the generated plurality of weights ($w_1$-$w_N$) and the example weight buffer 202 stores the generated plurality of weights corresponding to the mean and variance value of the single probability distribution (block 516). At block 518, the example PEs 208 access the weights and/or GMM samples from the weight buffer 202, access the activations from the input buffer 210, and apply the weights and/or GMM samples to the activations. As described above, the activations correspond to different forward passes and/or different images in a batch. Accordingly, the different activations are weighted by different weights that correspond to a single probability distribution. In this manner, the system memory 106 can output a single mean and variance value and multiple weights can be utilized for different data based on the mean and variance value.

At block 520, the example PSU 200 determines if additional weights and/or samples are needed (e.g., for a new set of forwarded passes, a new batch of data, or when a new and/or updated mean and or variance value(s) is/are received). If the example PSU 200 determines that new weights and/or samples are needed (block 520: YES), control returns to block 500. If the example PSU 200 determines that new weights and/or samples are not needed (block 520: NO), the instructions end. In some examples, the weights may be reused for a new set of activations. In such examples, if the PSU 200 determines that the weights are to be used for a new set of activations, control will return to block 518 to apply the weights to a new or subsequent activation data.

Figure 6:
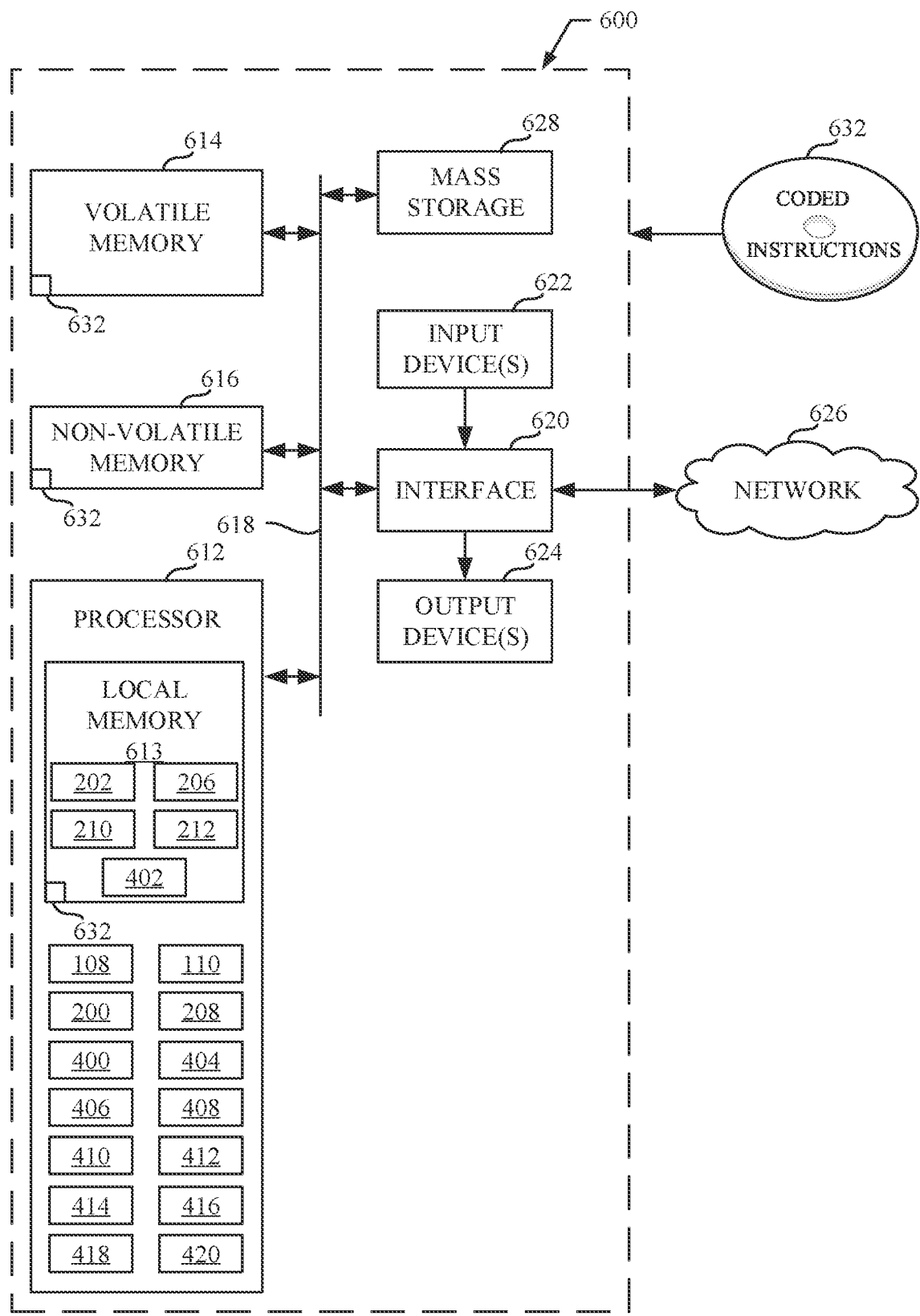
FIG. 6 is a block diagram of an example processing platform structured to execute the instructions of FIG. 5 to implement the example Bayesian compute node and/or programmable sampling unit of FIGS. 2A, 2B, 3, and/or 4.

FIG. 6 is a block diagram of an example processor platform 600 structured to execute the instructions of FIG. 5 to implement the example BNN 104 of FIGS. 1-4 The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device.

In this example, the processor 612 implements at least one of the example layers 108a-c, the example compute nodes 110c-e, the example PSU 200, the example PEs 208, the example GRNG unit 400, the example logic gate 404, the example Hadamard transform unit 406, the example parameterization unit 408, the example multiplier array 410, the example adder array 412, the example GMM processing unit 414, the example multiplier array 416, the example adder tree and mean unit 418, the example memory interface 420 of FIGS. 1-4.

The processor 612 of the illustrated example includes a local memory 613 (e.g., a cache). In the example of FIG. 6, the local memory 613 implements the example wight buffer 202, the example weight memory 206, the example input memory 210, the example output memory 212, and the example registers 402 of FIGS. 2A, 2B, 3, and/or 4. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller. The example local memory 613, the example volatile memory 614, and/or the example non-volatile memory 616 can implement the memory 106 of FIG. 1. Any one of the example volatile memory 614, the example non-volatile memory 616, and/or the example mass storage 628 may implement the example system memory 106 of FIGS. 1-2B.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

Figure 7:
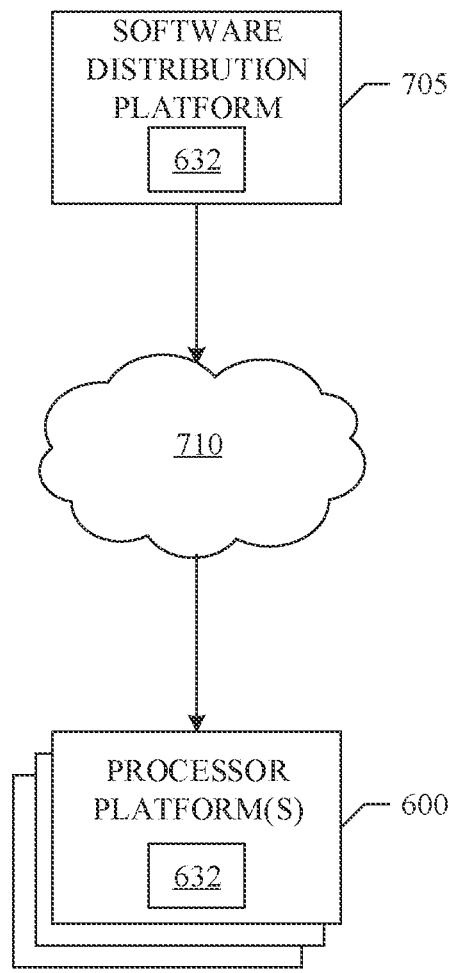
FIG. 7 is a block diagram of an example software distribution platform to distribute software (e.g., software corresponding to the example computer readable instructions of FIG. 5 to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 705 to distribute software such as the example computer readable instructions 632 of FIG. 6 to third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 632 of FIG. 6. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the computer readable instructions 632, which may correspond to the example computer readable instructions 500, 632 of FIGS. 5 and 6, as described above. The one or more servers of the example software distribution platform 705 are in communication with a network 710, which may correspond to any one or more of the Internet and/or any of the example networks 626 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 632 from the software distribution platform 705. For example, the software, which may correspond to the example computer readable instructions 632 of FIG. 6, may be downloaded to the example processor platform 1000, which is to execute the computer readable instructions 632 to implement the BNN 104. In some example, one or more servers of the software distribution platform 705 periodically offer, transmit, and/or force updates to the software (e.g., the example computer readable instructions 632 of FIG. 6) to ensure improvements, patches, updates, etc. are distributed and applied to the software at the end user devices.

Example methods, apparatus, systems, and articles of manufacture to provide a Bayesian compute unit with reconfigurable sampler and methods and apparatus to operate the same are disclosed herein. Further examples and combinations thereof include the following: Example 1 includes an apparatus to generate a plurality of weights for an artificial intelligence-based model, the apparatus comprising a number generator to generate a sequence of numbers, a multiplier to generate a plurality of products by multiplying respective numbers of the sequence of the numbers by a variance value, and an adder to generate a plurality of weights by adding a mean value to the plurality of products, the plurality of weights corresponding to a single probability distribution, the plurality of weights to be applied to a plurality of activations at a compute node of an artificial intelligence-based model.

Example 2 includes the apparatus of example 1, further including a first input memory to store a first part of a first activation and a first part of a second activation, the second activation being different than the first activation, and a second input memory to store a second part of the first activation and a second part of the second activation.

Example 3 includes the apparatus of example 2, further including a first processing element to generate first output values by applying (a) a first weight of the plurality of weights to the first part of the first activation and (b) a second weight of the plurality of weights to the first part of the second activation, and a second processing element to generate second output values by applying (a) the first weight to the second part of the first activation and (b) the second weight to the second part of the second activation, and output memory to store the first output values and the second output values.

Example 4 includes the apparatus of example 3, wherein the first activation corresponds to a first forward pass and the second activation corresponds to a second forward pass.

Example 5 includes the apparatus of example 3, wherein the first activation corresponds to a first image in a batch and the second activation corresponds to a second image in the batch.

Example 6 includes the apparatus of example 1, wherein the number generator is to generate a sequence to have a number of pseudo random numbers, the number corresponding to a total number of activations to be processed by a compute node.

Example 7 includes the apparatus of example 1, wherein the number generator is to generate a sequence to have a number of pseudo random numbers, the number corresponding to a total number of activations to be processed by a first compute node and a second compute node.

Example 8 includes the apparatus of example 1, wherein the mean value is a first mean value and the variance value is a first variance value, further including a mixture model processor to generate samples that correspond to a mixture model based on (a) the plurality of weights and (b) a second mean value and a second variance value.

Example 9 includes a non-transitory computer readable medium comprising instructions which, when executed, cause one or more processors to at least generate a sequence of numbers, generate a plurality of products by multiplying respective numbers of the sequence of the numbers by a variance value, and generate a plurality of weights by adding a mean value to the plurality of products, the plurality of weights corresponding to a single probability distribution.

Example 10 includes the computer readable medium of example 9, wherein the instructions cause the one or more processors to cause storage of a first part of a first activation and a first part of a second activation, the second activation being different than the first activation, and cause storage of a second part of the first activation and a second part of the second activation.

Example 11 includes the computer readable medium of example 10, wherein the instructions cause the one or more processors to generate first output values by applying (a) a first weight of the plurality of weights to the first part of the first activation and (b) a second weight of the plurality of weights to the first part of the second activation, and generate second output values by applying (a) the first weight to the second part of the first activation and (b) the second weight to the second part of the second activation, and cause storage of the first output values and the second output values.

Example 12 includes the computer readable medium of example 11, wherein the first activation corresponds to a first forward pass and the second activation corresponds to a second forward pass.

Example 13 includes the computer readable medium of example 11, wherein the first activation corresponds to a first image in a batch and the second activation corresponds to a second image in the batch.

Example 14 includes the computer readable medium of example 9, wherein the instructions cause the one or more processors to generate a sequence to have a number of pseudo random numbers, the number corresponding to a total number of activations to be processed by a compute node.

Example 15 includes the computer readable medium of example 9, wherein the instructions cause the one or more processors to generate a sequence to have a number of pseudo random numbers, the number corresponding to a total number of activations to be processed by a first compute node and a second compute node.

Example 16 includes the computer readable medium of example 9, wherein the mean value is a first mean value and the variance value is a first variance value, the instructions to cause the one or more processors to generate samples that correspond to a mixture model based on (a) the plurality of weights and (b) a second mean value and a second variance value.

Example 17 includes a neural network to apply a plurality of weights in an artificial intelligence-based model, the neural network comprising a first compute node including a first programmable sampling unit to generate a first weight and a second weight, the first and second weights corresponding to a single probability distribution, a first processing element to generate first output values by applying (a) the first weight to a first part of a first activation and (b) the second weight to the first part of a second activation, and a second processing element to generate second output values by applying (a) the first weight to a second part of the first activation and (b) the second weight to the second part of the second activation, and a second compute node including a second programmable sampling unit to generate a third weight and a fourth weight, the third and fourth weights corresponding to the single probability distribution, a third processing element to generate third output values by applying (a) the third weight to a first part of a third activation and (b) the fourth weight to the first part of a fourth activation, and a fourth processing element to generate fourth output values by applying (a) the third weight to a second part of the third activation and (b) the fourth weight to the second part of the fourth activation.

Example 18 includes the neural network of example 17, wherein the first compute node further includes a first input memory to store the first part of the first activation and the first part of the second activation, and a second input memory to store a second part of the first activation and the second part of the second activation.

Example 19 includes the neural network of example 18, wherein the first compute node further includes a first output memory to store the first output values, and a second output memory to store the second output values.

Example 20 includes the neural network of example 19, wherein the first activation corresponds to a first forward pass and the second activation corresponds to a second forward pass.

Example 21 includes the neural network of example 19, wherein the first activation corresponds to a first image in a batch and the second activation corresponds to a second image in the batch.

Example 22 includes the neural network of example 17, wherein the single probability distribution corresponds to a mean and a variance.

Example 23 includes the neural network of example 17, wherein the single probability distribution corresponds to a mixture model distribution.

Example 24 includes the neural network of example 17, wherein the first compute node and the second compute node are to generate the first, second, third, and fourth weights simultaneously.

From the foregoing, it will be appreciated that example methods, apparatus and articles of manufacture have been disclosed that provide a Bayesian compute unit with reconfigurable sampler and methods and apparatus to operate the same. BNNs introduce uncertainty information to overcome the problems of overfitting and sensitivity to malicious attacks. Instead of using fixed weights, BNNs introduce weights associated with conditioned probability distribution (e.g., the output weight may be a value within a probability distribution defined by a mean and standard deviation). Because BNNs introduce some amount of randomness, BNNs can be trained with smaller training data without sacrificing accuracy. However, traditional BNNs distribute different mean and variance value(s) corresponding to different probability distributions for every compute node in a layer. Therefore, such traditional BNNs require a large amount of bandwidth and take time to access the multiple mean and variance values from system memory to generate weights that correspond to the multiple different probability distributions.

Examples disclosed herein generate multiple weights that correspond to a single probability distribution (e.g., a Gaussian distribution and/or a GMM distribution). Examples disclosed herein utilize the multiple weights to apply to a plurality of different activations in a compute node of a AI-based model (e.g., a neural network, a machine learning model, a deep learning model, etc.). In this manner, only mean value(s) and variance value(s) corresponding to a single distribution are accessed from system memory to apply to multiple different activations. Thereby reducing the bandwidth and time needed to access probability distribution data to generate weights. Additionally, some examples disclosed herein generate weights in each individual compute node to reduce the latency associated with distributing multiple weights to a plurality of nodes. Accordingly, the disclosed methods, apparatus and articles of manufacture are accordingly directed to one or more improvement(s) in the functioning of a neural network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for an artificial intelligence-based model, the apparatus comprising:

memory to store a variance value and a mean value, the mean value and the variance value resulting from training of the artificial intelligence-based model; and a plurality of neurons, each neuron including:
number generator circuitry to generate a first random number and a second random number;
multiplier circuitry to:
generate a first product by multiplying the first random number by the variance value; and
generate a second product by multiplying the second random number by the variance value;
adder circuitry to:
generate a first weight by adding the mean value to the first product; and
generate a second weight by adding the mean value to the second product, the first and second weights corresponding to a single probability distribution;
a first processing element to apply the first weight to a first activation; and
a second processing element to apply the second weight to a second activation.

2. The apparatus of claim 1, wherein memory includes a first input memory and a second input memory:
the first input memory to store a first part of the first activation and a first part of the second activation;
the second input memory to store a second part of the first activation and a second part of the second activation; and
wherein the second activation is different than the first activation.

3. The apparatus of claim 2, wherein:
the first processing element is to generate first output values by applying (a) the first weight to the first part of the first activation and (b) second weight to the first part of the second activation;
the second processing element to generate second output values by applying (a) the first weight to the second part of the first activation and (b) the second weight to the second part of the second activation; and
output memory to store the first output values and the second output values.

4. The apparatus of claim 3, wherein the first activation corresponds to a first forward pass and the second activation corresponds to a second forward pass.

5. The apparatus of claim 3, wherein the first activation corresponds to a first image in a batch and the second activation corresponds to a second image in the batch.

6. The apparatus of claim 1, wherein the number generator circuitry is to generate a sequence to have a number of pseudo random numbers, the number corresponding to a total number of activations to be processed by at least one of the first processing element or the second processing element.

7. The apparatus of claim 1, wherein the first and second processing elements are implemented in a first compute node, the number generator circuitry to generate a sequence to have a number of pseudo random numbers, the number corresponding to a total number of activations to be processed by the first compute node and a second compute node.

8. The apparatus of claim 1, wherein the mean value is a first mean value and the variance value is a first variance value, further including a mixture model processor to generate samples that correspond to a mixture model based on (a) the first weight and the second weight and (b) a second mean value different from the first mean value and a second variance value different from the first variance value.

9. A non-transitory computer readable medium comprising instructions which cause one or more processors to at least:
cause storage of a variance value and a mean value, the mean value and the variance value resulting from training of an artificial intelligence-based model;
generate a first random number and a second random number;
generate a first product by multiplying the first random number by the variance value;
generate a second product by multiplying the second random number by the variance value;
generate a first weight by adding the mean value to the first product;
generate a second weight by adding the mean value to the second product, the first and second weights corresponding to a single probability distribution;
apply the first weight to a first activation; and
apply the second weight to a second activation.

10. The computer readable medium of claim 9, wherein the instructions cause the one or more processors to:
cause storage of a first part of the first activation and a first part of the second activation;
cause storage of a second part of the first activation and a second part of the second activation; and
wherein the second activation is different than the first activation.

11. The computer readable medium of claim 10, wherein the instructions cause the one or more processors to:
generate first output values by applying (a) the first weight the first part of the first activation and (b) the second weight to the first part of the second activation;
generate second output values by applying (a) the first weight to the second part of the first activation and (b) the second weight to the second part of the second activation; and
cause storage of the first output values and the second output values.

12. The computer readable medium of claim 11, wherein the first activation corresponds to a first forward pass and the second activation corresponds to a second forward pass.

13. The computer readable medium of claim 11, wherein the first activation corresponds to a first image in a batch and the second activation corresponds to a second image in the batch.

14. The computer readable medium of claim 9, wherein the instructions cause the one or more processors to generate a sequence to have a number of pseudo random numbers, the number corresponding to a total number of activations to be processed by a compute node.

15. The computer readable medium of claim 9, wherein the instructions cause the one or more processors to generate a sequence to have a number of pseudo random numbers, the number corresponding to a total number of activations to be processed by a first compute node and a second compute node.

16. The computer readable medium of claim 9, wherein the mean value is a first mean value and the variance value is a first variance value, the instructions to cause the one or more processors to generate samples that correspond to a mixture model based on (a) the first weight and the second weight and (b) a second mean value different than the first mean value and a second variance value different than the first variance value.

17. A system to implement neural network to apply a plurality of weights in an artificial intelligence-based model, the system comprising:

a first hardware-implemented compute node including:
- a first programmable sampling unit to generate a first weight and a second weight, the first and second weights corresponding to a single probability distribution;
- a first processing element to generate first output values by applying (a) the first weight to a first part of a first activation and (b) the second weight to the first part of a second activation; and
- a second processing element to generate second output values by applying (a) the first weight to a second part of the first activation and (b) the second weight to the second part of the second activation; and a second hardware-implemented compute node including:
- a second programmable sampling unit to generate a third weight and a fourth weight, the third and fourth weights corresponding to the single probability distribution;
- a third processing element to generate third output values by applying (a) the third weight to a first part of a third activation and (b) the fourth weight to the first part of a fourth activation; and
- a fourth processing element to generate fourth output values by applying (a) the third weight to a second part of the third activation and (b) the fourth weight to the second part of the fourth activation.

18. The system of claim 17, wherein the first compute node further includes:
- a first input memory to store the first part of the first activation and the first part of the second activation; and
- a second input memory to store a second part of the first activation and the second part of the second activation.

19. The system of claim 18, wherein the first compute node further includes:
- a first output memory to store the first output values; and
- a second output memory to store the second output values.

20. The system of claim 19, wherein the first activation corresponds to a first forward pass and the second activation corresponds to a second forward pass.

21. The system of claim 19, wherein the first activation corresponds to a first image in a batch and the second activation corresponds to a second image in the batch.

22. The system of claim 17, wherein the single probability distribution corresponds to a mean and a variance.

23. The system of claim 17, wherein the single probability distribution corresponds to a mixture model distribution.

24. The system of claim 17, wherein the first compute node and the second compute node are to generate the first, second, third, and fourth weights simultaneously.

* * * * *